US008684822B2

(12) United States Patent
Gallaway et al.

(10) Patent No.: US 8,684,822 B2
(45) Date of Patent: Apr. 1, 2014

(54) SYSTEM-LEVEL BONUS GAME AND RELATED METHODS

(75) Inventors: Ronald C. Gallaway, Reno, NV (US); Carmen DiMichele, Sparks, NV (US); Melissa Juenger, Reno, NV (US); William Decoux, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 75 days.

(21) Appl. No.: 11/241,183

(22) Filed: Sep. 30, 2005

(65) Prior Publication Data

US 2006/0111178 A1 May 25, 2006

Related U.S. Application Data

(63) Continuation-in-part of application No. 11/225,770, filed on Sep. 12, 2005, now abandoned, which is a continuation-in-part of application No. 10/943,771, filed on Sep. 16, 2004, now Pat. No. 7,950,999.

(60) Provisional application No. 60/615,043, filed on Sep. 30, 2004.

(51) Int. Cl.
*A63F 13/00* (2006.01)

(52) U.S. Cl.
USPC .................. 463/25; 463/16; 463/17; 463/18; 463/19; 463/20

(58) Field of Classification Search
USPC .................. 463/13, 25, 26, 27, 40–42, 16–20
See application file for complete search history.

(56) References Cited

U.S. PATENT DOCUMENTS

| | | | |
|---|---|---|---|
| 3,662,105 | A | 5/1972 | Hurst et al. |
| 4,448,419 | A | 5/1984 | Telnaes |
| 4,676,506 | A | 6/1987 | Crouch |
| 4,718,672 | A | 1/1988 | Okada |
| 4,837,728 | A | 6/1989 | Barrie et al. |
| 5,429,361 | A | 7/1995 | Raven et al. |
| 5,599,231 | A | 2/1997 | Hibino et al. |
| 5,655,961 | A | 8/1997 | Acres et al. |
| 5,702,304 | A | 12/1997 | Acres et al. |
| 5,741,183 | A | 4/1998 | Acres et al. |
| 5,752,882 | A | 5/1998 | Acres et al. |
| 5,759,102 | A | 6/1998 | Pease et al. |
| 5,769,716 | A | 6/1998 | Saffari et al. |

(Continued)

FOREIGN PATENT DOCUMENTS

| | | |
|---|---|---|
| AU | 704691 | 4/1997 |
| EP | 0769769 A1 | 4/1997 |
| WO | 2004/024260 | 3/2004 |

*Primary Examiner* — David L Lewis
*Assistant Examiner* — Ross Williams
(74) *Attorney, Agent, or Firm* — Marvin Hein

(57) ABSTRACT

Bonus gaming systems for monitoring and controlling one or more gaming devices in a gaming system on at least one gaming floor are disclosed herein. The system includes one or more gaming devices interconnected via a network, a player tracking system in communication with the gaming devices, and a bonus gaming system in communication with the gaming devices. The bonus gaming system monitors and controls bonus sessions presented on the gaming devices, wherein the bonus sessions includes a plurality of bonus levels, wherein the bonus levels increase in bonus value in response to duration of game play by a player in order to maintain continued play by the player.

18 Claims, 4 Drawing Sheets

(56) References Cited

U.S. PATENT DOCUMENTS

| | | | | |
|---|---|---|---|---|
| 5,770,533 | A | 6/1998 | Franchi | |
| 5,779,545 | A | 7/1998 | Berg et al. | |
| 5,796,389 | A | 8/1998 | Bertram et al. | |
| 5,809,482 | A | 9/1998 | Strisower | |
| 5,816,918 | A | 10/1998 | Kelly et al. | |
| 5,820,459 | A | 10/1998 | Acres et al. | |
| 5,833,536 | A | 11/1998 | Davids et al. | |
| 5,833,540 | A | 11/1998 | Miodunski et al. | |
| 5,836,817 | A | 11/1998 | Acres et al. | |
| 5,851,148 | A | 12/1998 | Brune et al. | |
| 5,876,284 | A | 3/1999 | Acres et al. | |
| 5,885,158 | A | 3/1999 | Torango et al. | |
| 5,919,091 | A | 7/1999 | Bell et al. | |
| 5,967,896 | A | 10/1999 | Jorasch et al. | |
| 5,984,779 | A | 11/1999 | Bridgeman et al. | |
| 6,008,784 | A | 12/1999 | Acres et al. | |
| 6,010,404 | A | 1/2000 | Walker et al. | |
| 6,068,552 | A | 5/2000 | Walker et al. | |
| 6,077,163 | A | 6/2000 | Walker et al. | |
| 6,110,041 | A | 8/2000 | Walker et al. | |
| 6,113,495 | A | 9/2000 | Walker et al. | |
| 6,162,122 | A | 12/2000 | Acres et al. | |
| 6,244,958 | B1 | 6/2001 | Acres | |
| 6,254,483 | B1 | 7/2001 | Acres | |
| 6,257,981 | B1 | 7/2001 | Acres et al. | |
| 6,280,328 | B1 | 8/2001 | Holch et al. | |
| 6,302,790 | B1 | 10/2001 | Brossard | |
| 6,312,333 | B1 | 11/2001 | Acres | |
| 6,319,125 | B1 | 11/2001 | Acres | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,431,983 | B2 | 8/2002 | Acres | |
| RE37,885 | E | 10/2002 | Acres | |
| 6,565,434 | B1 | 5/2003 | Acres | |
| 6,575,832 | B1 * | 6/2003 | Manfredi et al. | 463/25 |
| 6,607,441 | B1 | 8/2003 | Acres | |
| 6,652,378 | B2 | 11/2003 | Cannon et al. | |
| 6,712,697 | B2 | 3/2004 | Acres | |
| 6,712,698 | B2 | 3/2004 | Paulsen et al. | |
| 6,722,985 | B2 | 4/2004 | Criss-Puszkiewicz | |
| 6,722,986 | B1 | 4/2004 | Lyons et al. | |
| 6,800,030 | B2 | 10/2004 | Acres | |
| 6,832,958 | B2 | 12/2004 | Acres et al. | |
| 6,878,063 | B2 * | 4/2005 | Manfredi et al. | 463/25 |
| 6,910,964 | B2 | 6/2005 | Acres | |
| 6,939,229 | B2 * | 9/2005 | McClintic | 463/25 |
| RE38,812 | E | 10/2005 | Acres et al. | |
| D531,333 | S | 10/2006 | Acres et al. | |
| 2002/0169021 | A1 * | 11/2002 | Urie et al. | 463/25 |
| 2003/0060247 | A1 | 3/2003 | Goldberg et al. | |
| 2003/0104853 | A1 | 6/2003 | Tessmer et al. | |
| 2003/0125107 | A1 * | 7/2003 | Cannon | 463/25 |
| 2003/0157979 | A1 * | 8/2003 | Cannon et al. | 463/16 |
| 2003/0176219 | A1 * | 9/2003 | Manfredi et al. | 463/25 |
| 2004/0002383 | A1 | 1/2004 | Lundy et al. | |
| 2004/0100490 | A1 | 5/2004 | Boston et al. | |
| 2004/0142750 | A1 | 7/2004 | Glisson et al. | |
| 2004/0242322 | A1 | 12/2004 | Montagna et al. | |
| 2005/0009601 | A1 * | 1/2005 | Manfredi et al. | 463/29 |
| 2005/0051021 | A1 | 3/2005 | Laakso | |
| 2005/0075165 | A1 | 4/2005 | George et al. | |
| 2005/0079908 | A1 | 4/2005 | Pacey | |
| 2005/0181864 | A1 * | 8/2005 | Britt et al. | 463/25 |
| 2005/0215311 | A1 | 9/2005 | Hornik et al. | |

* cited by examiner

SYSTEM-LEVEL BONUS GAME AND RELATED METHODS

CROSS-REFERENCE TO RELATED APPLICATIONS

This application claims the benefit of U.S. provisional patent Application No. 60/615,043, filed Sep. 30, 2004, which is herein incorporated by reference in its entirety. This application is also a continuation-in-part of U.S. patent application Ser. No. 11/225,770 filed Sep. 12, 2005, now abondoned entitled SYSTEM AND METHOD FOR GAMING-CONTENT CONFIGURATION AND MANAGEMENT SYSTEM, which is a continuation-in-part of U.S. patent application Ser. No. 10/943,771, filed Sep. 16, 2004, now U.S. Pat. No. 7,950,999 entitled USER INTERFACE SYSTEM AND METHOD FOR A GAMING MACHINE, wherein the contents of these applications are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest. However, progressive games are typically part of a large network of gaming machines that are located within multiple casinos. As such, a player may have the opportunity to win a progressive jackpot at any casino having the progressive game. Thus, it is difficult to maintain casino patronage solely based upon the award size.

Accordingly, over the years, gaming machines have grown in sophistication and features to maintain player interest. For example, gaming machines have been developed to include animation, stereo-quality sound, graphics, and the like to provide a fuller gaming experience for players. Furthermore, gaming machines have been developed that include secondary displays to provide players with access to gambling-related information, news, and advertisements.

Furthermore, casino operators have developed various programs in order to obtain and maintain casino patronage. For example, casinos offer player club programs that provide player with prizes, awards, or compensation in the form of free rooms, meals, and drinks in order to induce players to gamble at their establishments. Additionally, casinos may have promotions such as slot tournaments or the like to attract players. However, these promotions have to be planned in advance and require substantial resources to promote and operate.

Thus, there is a continuing need for a gaming machines and gaming systems having bonus mechanisms that provide casino operators with administrative flexibility and profitability. Furthermore, there is a continuing need for a gaming system or methodology that provides increased player excitement.

SUMMARY

Briefly, and in general terms, various embodiments are directed to a bonus gaming system for monitoring and controlling bonus sessions on one or more gaming devices in a gaming system on at least one gaming floor. For example, the bonus gaming system awards players for reaching certain predetermined point accumulations during a specified period of time. Accordingly, the bonus gaming system allows a casino operator to retain player patronage by providing a flexible and readily adjustable bonus gaming system. The bonus gaming system allows a casino operator to schedule the triggering of a bonus session, limit bonus sessions to qualified players, and operate the bonus gaming system in one or more locations. Furthermore, a casino operator can further customize the various parameters of the bonus gaming system. For example, the casino operator can select the types of games that participate in the bonus sessions by criteria such as denomination, type of game, or gaming device location.

In one embodiment, the bonus gaming system includes one or more gaming devices interconnected via a network, a player tracking system in communication with the gaming devices, and a bonus gaming system in communication with the gaming devices. The bonus gaming system monitors and controls bonus sessions presented on the gaming devices, wherein the bonus sessions include a plurality of bonus levels, wherein the bonus sessions include a plurality of bonus levels that increase in bonus value in response to duration of game play by a player in order to maintain continued play by the player.

In another embodiment, the bonus gaming system includes one or more gaming devices interconnected via a network, a player tracking system in communication with the gaming devices, and a processing and control system interconnected to the gaming devices via the network. The player tracking system includes an embedded player tracking user interface incorporated into the gaming devices. The processing and control system manages and configures the bonus sessions presented on the gaming devices, wherein the bonus sessions include a plurality of bonus levels, wherein the bonus levels increase in bonus value in response to a total amount wagered by a player in order to maintain continued play by the player.

In addition to various embodiments of a bonus gaming system, various methods of managing a bonus game for a gaming system having one or more networked gaming devices. According to one method, player information is obtained from a player, and a gaming session is activated on a gaming device. Once the gaming session has been activated, the bonus gaming system determines whether a triggering event is satisfied. A bonus session that includes a plurality of bonus levels is configured and initiated in response to the triggering event being identified. The bonus gaming system also provides bonus session information to the player. During the player's gaming session, the system monitors the points accumulated by the player. A bonus prize is awarded to the player when the player obtains a predetermined number of points to achieve a particular bonus level.

Other features and advantages will become apparent from the following detailed description, taken in conjunction with the accompanying drawings, which illustrate by way of example, the features of the various embodiments.

DETAILED DESCRIPTION

Various embodiments are directed to a gaming system for managing system-level bonus games that are designed to include a plurality of bonus levels. The bonus gaming system manages and configures the bonus game for a scalable number of gaming devices using a centrally-connected user interface. The bonus game is readily customizable according to various parameters selected by the casino operator such as, but not limited to, bonus game scheduling, eligible gaming devices, and eligible players. The casino operator may also determine the number of points a player needs to accumulate to achieve a particular bonus level.

In use, as the player earns points to advance to the next level, a system award is dispensed to the player. As a result, the casino patron is enticed to stay and play a gaming machine for an extended period of time in view of earning various system awards. In contrast to a progressive award (where a single large prize is dispensed) or a cash rebate program (where a player receives a percentage of his wager), the bonus gaming system provides each player with the opportunity to win a system award when the player reaches each bonus level.

As described below, an embedded additional user interface is preferably integrated into a gaming machine and acts to increase user excitement by providing a richer gaming experience. An embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some embodiments. Moreover, such a user interface is sometimes referred to as a player tracking user interface because this device often uses player-specific information to maximize its usefulness and functionality.

Figure 1:
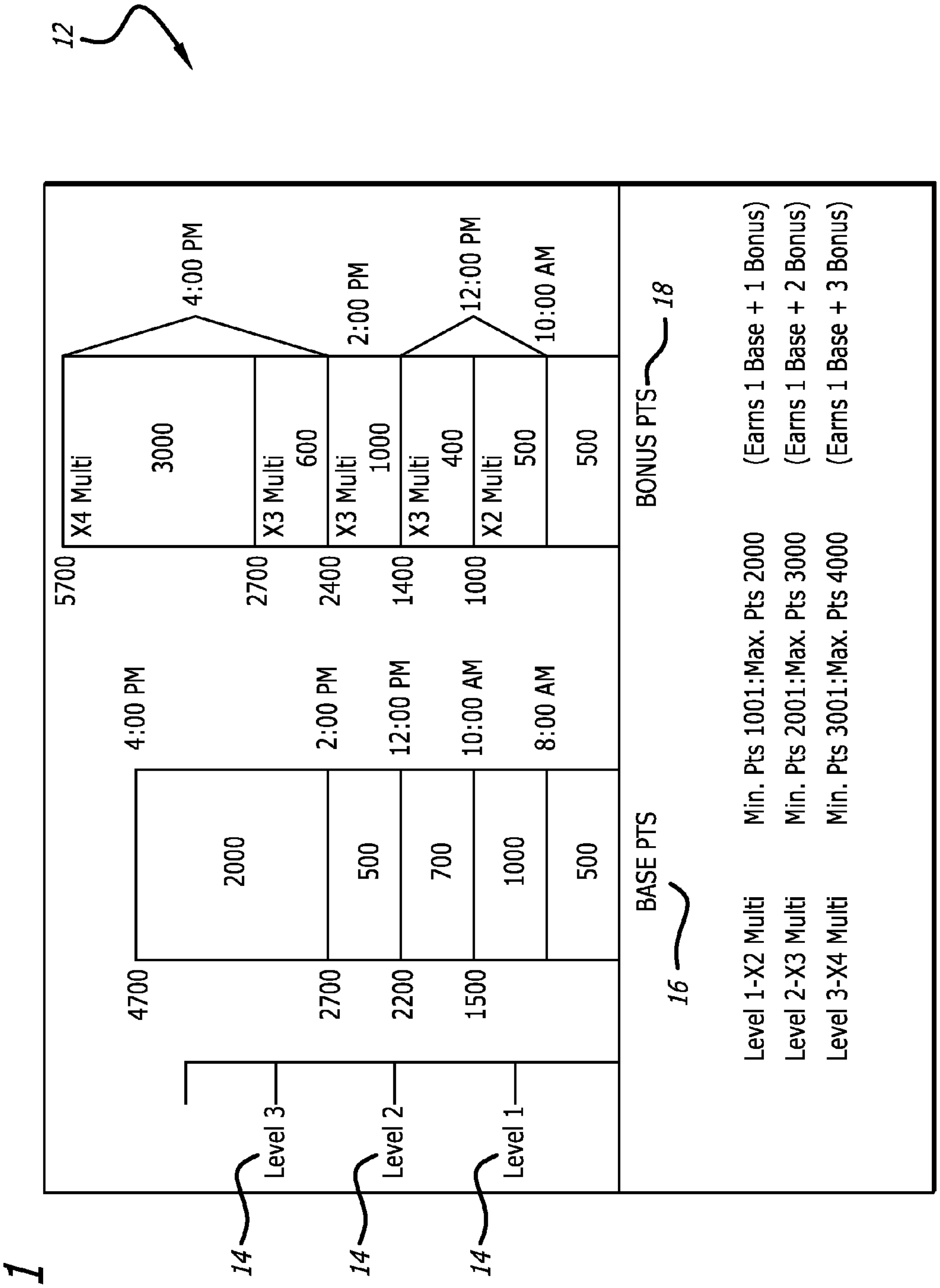
FIG. 1 illustrates one embodiment of a bonus game having a plurality of levels.

Referring now to the drawings, wherein like reference numerals denote like or corresponding parts throughout the drawings, and more particularly to FIGS. 1-4, there are shown various embodiments of a bonus gaming system 10. Specifically, FIG. 1 illustrates one embodiment of a bonus game 12 having three levels 14. However, as those skilled in the art will appreciate, the bonus game 12 may have a plurality of levels. According to the embodiment shown in FIG. 1, base points 16 and bonus points 18 may be earned in the bonus game 12. Generally, the base points 12 correlate to a player's gaming activity in the base game, and the bonus points 18 are additional points that may be awarded to the player during the course of the bonus session to allow the player to achieve the next bonus level more rapidly. Also, each level 14 of the bonus game 12 may have the same number of points. For example, level 1 may require a minimum of 1000 points to a maximum of 2000 points, level 2 may require a minimum of 2001 points to a maximum of 3000 points, and level 3 may require a minimum of 3001 points and maximum of 4000. In alternate embodiments, casino operators may adjust the point requirements for each bonus level 14 such that each subsequent level has a higher or lower point requirement. However, as those skilled in the art will appreciate, the bonus game 12 may be configured by the bonus gaming system 10 to produce any combination of point requirements for each level 14.

As shown in FIG. 1, the bonus game 12 may include bonus points 18 in addition to the base points 16. In one embodiment, the bonus points 18 may be a multiple of the base points 16. For example, at level 1, a 2× multiplier may be used to double the player's points (i.e., the player earns 1 base point, and 1 bonus point); at level 2, a 3× multiplier may be used to triple the player's points (i.e., the player earns 1 base point, and 2 bonus points); and at level 3, a 4× multiplier may be used to quadruple the player's points (i.e., the player earns 1 base point, and 3 bonus points). As those skilled in the art will appreciate, the bonus gaming system 10 may be used to configure the number and value of the multipliers for each level 14. Accordingly, for example, one or more multipliers may be used for each bonus level 14. In an alternative embodiment, the bonus game (not shown) may only be based upon base points 16.

In one embodiment, earning points in the bonus game 12 is based upon the player's time of play with respect to the base game (not shown). Accordingly, the longer the player plays the base game, the more base points 16 (and, in some embodiments, bonus points 18) that player earns for the bonus game 12. In one embodiment, the bonus game 12 may be configured to have one point correspond to a particular game play duration for the base game (e.g., five minutes of playing the base game corresponds to one bonus point). As those skilled in the art will appreciate, the bonus gaming system 10 may be used to modify the relationship between game play duration and resulting bonus points.

In another embodiment, points 16, 18 earned in the bonus game 12 may be based upon "coin-in." That is, the points 16, 18 earned are based upon the wagers made by the player. Accordingly, the more money the player wagers in the base game, the more points 16, 18 the player earns in the bonus game 12. Alternatively, bonus points 16, 18 may be earned based upon other criteria such as, but not limited to, number of max bets, bets per hour, number of wagers per hour, or a combination thereof. In yet another embodiment, points 16, 18 earned in the bonus game 12 may be based upon "coin-out" values. That is, the points 16, 18 earned are based upon winning outcomes in the base game. For example, a winning outcome of five credits in the base game may correlate to ten points earned in the bonus game 12. As those skilled in the art will appreciate, the bonus gaming system 10 may set forth the relationship (i.e. ratio or correlation) between a player criteria performance (e.g., coin-in, number of max bets, bets per hour, etc.) in the base game and the points earned in the bonus game 12.

Figure 2:
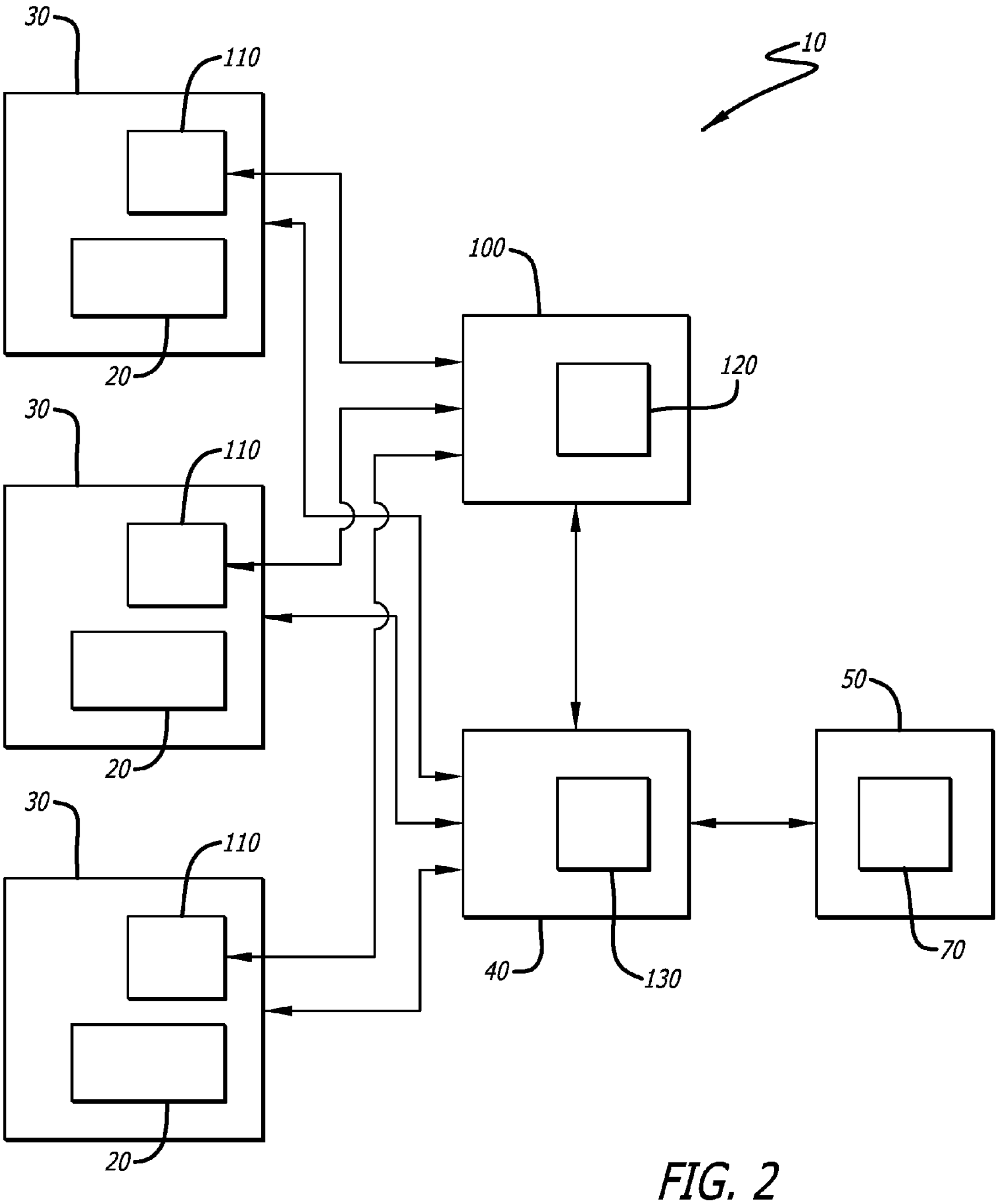
FIG. 2 illustrates one embodiment of a bonus gaming system.

Turning now to FIG. 2 shows a bonus gaming system 10 that enables configuration and management of a bonus game presented on one or more gaming devices 30 (e.g., gaming machines, gaming machine component, system components, network components, kiosks, signage, gaming-related devices, and the like) on the gaming floors of incorporated gaming venues. Preferably, such gaming venues include casinos, Class II venues, and lottery venues. In one embodiment of the bonus gaming system 10, gaming devices 30 and system components are incorporated into a broadband-networked gaming floor, instead of operating independently (or quasi-independently) as stand-alone platforms and basic monitoring systems.

As shown in FIG. 2, the bonus gaming system 10 includes a system server 40 that is in communication with the gaming devices 30 or various components associated with the gaming device. The bonus gaming system 10 also includes a desktop computer 50 (or other portable computer or hand held device) that is in communication with the server 40 and enables operators to manage the gaming floor from the computer. In one embodiment, the computer 50 allows operators to manage the gaming floor via a graphical user interface 70 on the computer.

The system 10 is capable of administrating gaming floors ranging in size from a single slot floor to a worldwide gaming enterprise. In one embodiment, the system 10 administrates a system-level bonus game. In another embodiment, the system 10 may also administrate gaming devices 30 on the gaming floors that are multi-platform, multi-theme, multi-percentage, and multi-denomination. Otherwise stated, in such an embodiment, each of the gaming devices 30 (or at least some gaming devices) incorporate multiple game platforms, incorporate multiple game titles (stored locally or remotely), are capable of being configured to generate multiple different payout percentages, and are capable of offering multiple different monetary denominations for game play. Alternatively, the gaming devices 30 may offer a single game option such as mechanical slots, video slots, video poker, video blackjack, keno, Class II bingo, or the like. Central management of all these gaming options is enabled from the graphical user interface 70.

Figure 3:
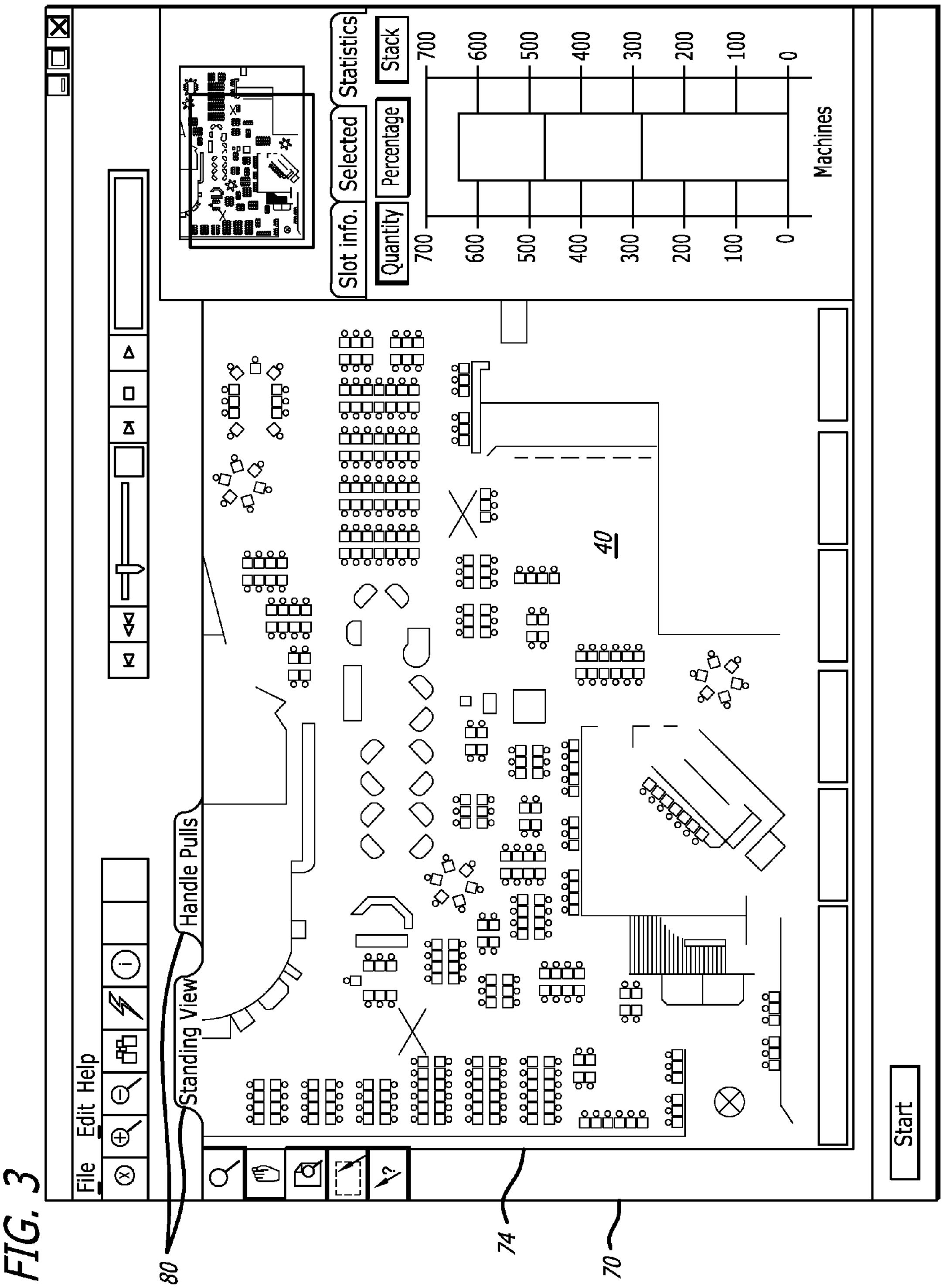
FIG. 3 illustrates one view of a map of a casino gaming floor via a graphical user interface of the bonus gaming system.

Accordingly, in one embodiment of the bonus gaming system 10, a graphical user interface 70 is accessible via a gaming floor operator's computer 50. In such an embodiment, as shown in FIG. 3, a graphical user interface 70 displays a map 74 of the slot floor 76. Preferably, this map 76 of slot floor 40 includes multiple selectable layers 80. Gaming-related information is organized by layer 80 with each layer displaying a different category of gaming-related information. In one specific, non-limiting embodiment, a first layer 80 displayed on the graphical user interface 70 shows game themes (i.e., game titles) that are currently populating the slot floor. Preferably, each game theme is emphasized with a distinct color in order to differentiate one game theme from another game theme. Continuing, in this specific, non-limiting embodiment, a second layer 80 of the map 76 displays information that relates to the bonus game. In this manner, each layer 80 displayed on the graphical user interface 70 presents different gaming related information including, by way of example only, and not by way of limitation, device volume settings, coin-in activity, coin-out activity, meters, other accounting information, security information, and player rating information.

As briefly mentioned above, the graphical user interface 70 may be used to configure various parameters of the bonus game. One such parameter is the number of levels of the bonus game. Accordingly, casino operators can set the bonus game to have any number of levels via the graphical user interface 70. In one embodiment, the bonus game includes a plurality of levels. For example, the bonus game may be configured with four bonus levels. As those skilled in the art will appreciate, the bonus game may include any number of levels.

In addition to selecting the number of levels, the graphical user interface 70 may be used to configure each bonus level. In one embodiment, the initial bonus level has a low number of points and each subsequent level requires a greater number of points to achieve the next level. Accordingly, a player may initially win a small award and also obtain larger awards the longer the player plays the game. Alternatively, the bonus game may be configured such that each bonus level has same number of points per bonus level.

Another parameter of the bonus game that is controlled by the graphical user interface 70 relates to the scheduling of the bonus game. The casino operator may select the appropriate start and stop dates for the bonus game promotion. In various embodiments, the casino operator may be select one or more days, months, or customized periods of time. For example, the casino operator may select to run the bonus game promotion during slow times (e.g., slow times during the day, month, or year). In an alternate embodiment, the bonus game may be scheduled to trigger for special events such as a player's birthday, anniversary, or the like.

Another parameter of the game relates to selecting the gaming devices 30 that present the bonus game. A scalable number of gaming devices 30 may be selected to participate in the bonus session. From the graphical user interface 70, casino operators may select participating gaming devices 30 based upon location, denomination, game type, or a combination thereof. Accordingly, the selected gaming devices 30 may be located in a particular bank of gaming devices in one casino. Alternatively, the gaming devices 30 may be located in multiple sites (e.g., one or more casinos or any other location where gaming is permitted). These multiple sites may be located in the same state or in different states. In another embodiment, the multiple sites may be affiliated (i.e., owned or controlled by a single corporate entity) or unaffiliated (e.g., unaffiliated Indian gaming casinos). Alternatively, operators may, for example, select all quarter denomination gaming devices to present the bonus game to qualified players. With respect to the game type, the interface 70 may be used to select, for example, all video poker games. As those skilled in the art will appreciate, the selection of gaming devices 30 that present the bonus game may be based upon any criteria set by the casino operator.

The bonus game is also configurable with respect to player participation. That is, only particular player types may be eligible to participate in the bonus gaming session. Generally, the "player type" is a player that is enrolled in the casino's player club. However, the bonus system may be configured to allow any player to participate. For example, a group (e.g. tour bus group) may be eligible to participate in a bonus session. Alternatively, the player type may be based upon the player's status. For example, only VIP or players having achieved a particular player level are eligible to participate in the bonus session.

Referring back to FIG. 2, in one embodiment, the gaming devices 30 either include or are associated with a player tracking system 100. According to one embodiment, the player tracking system 100 is a separate system that is in communication with the bonus gaming system 10. Alternatively, the player tracking system 100 may be integrated into the bonus gaming server 40. In one embodiment, the player tracking system 100 is a player card reader 110 and an associated central system 120. In another embodiment, the reader 110 is capable of reading information contained on a player card and transmitting this information to the tracking central system 120, which in turn transmits the data to the bonus gaming system 10, or directly transmit this information to the bonus gaming system. In another embodiment, the player tracking system 100 is a player card reader/writer that can read and write information to a player card. Information that may be read from the card includes, but is not limited to, the player's name, rating, and/or accrued points. In another embodiment, the player tracking system 100 includes biometric information including, but not limited to, fingerprints or signatures to verify the identity of the cardholder.

Additionally, the gaming devices 30 may include an embedded additional user interface 20. The embedded additional user interface 20 includes a web content capable display screen and an embedded processor. Preferably, the web content capable display screen presents web information to a user via the display screen. The embedded processor preferably utilizes an internal operating system and communicates with the gaming processor. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to input information, make selections, receive promotional information or other types of information including, but not limited to, notification that the player has won a system award.

In one embodiment, the gaming devices 30 either include or are associated with signage and kiosks. In this regard, gaming-related signage relates to advertising signage that is typically in a reconfigurable electronic format. In this context, gaming-related kiosks are machines that provide gaming-related service but do not provide actual game play itself. Gaming-related kiosks may include both patron-oriented services and maintenance-oriented features. In one embodiment, patron-oriented services include the ability to sign on to rewards services, view account status and history, redeem payout tickets and promotional "comps," request help from an attendant, order drinks, make dinner reservations, reserve taxis, purchase show tickets, conduct banking transactions, and the like. Maintenance-oriented features include providing information such as coin-in, coin-out, malfunctions, jackpots, tilt conditions, game software version, and the like.

Additionally, the server 40 of the bonus gaming system 10 may include a datastore 130 capable of sorting and grouping data from the gaming devices 30 for the purpose of inventory management. In this regard, a property (e.g. casino) is able to maintain up-to-date information on gaming floor inventory for a multitude of inventory parameters. These inventory parameters include, by way of example only, and not by way of limitation, the name of the embedded additional user interface, the hardware revision of the embedded additional user interface, the firmware revision of the embedded additional user interface, the content of the embedded additional user interface, the make/model of the game monitoring unit (GMU), the hardware revision of the GMU, the firmware revision of the GMU, the make/model of the gaming machine, the hardware revision of the gaming machine, the firmware revision of the gaming machine, and the physical location of the gaming machine.

In one embodiment of the bonus gaming system 10, the system is able to analyze, automate, schedule, and control the options, operation, and configuration for thousands of machines. The system 10 is capable of providing this control from a single property to many properties that may span states, countries, and even throughout the world. Preferably, a map 74 is presented via the graphical use interface 70 of the system 10, which is used to present information to a casino administrator in an easily understandable format. In this manner, a casino administrator is able to see historical results and then schedule changes in the slot floor using the map 74, presented via the graphical use interface 70.

In another embodiment, the bonus gaming system 10 enables control of game theme (i.e., game title), game percentage payout, and game denomination. Thus, the system 10 is able to control and manage a multi-platform, multi-theme, multi-percentage, and multi-denomination gaming floor. Additionally, one embodiment of the system 10 also includes platform-specific control over functions such as the volume setting of the device, speed of play, hopper limits, and the like. Moreover, these functions further include, by way of example only, and not by way of limitation: access to logs, platform-specific reports, and asset information (e.g., software and hardware bills of material).

Figure 4:
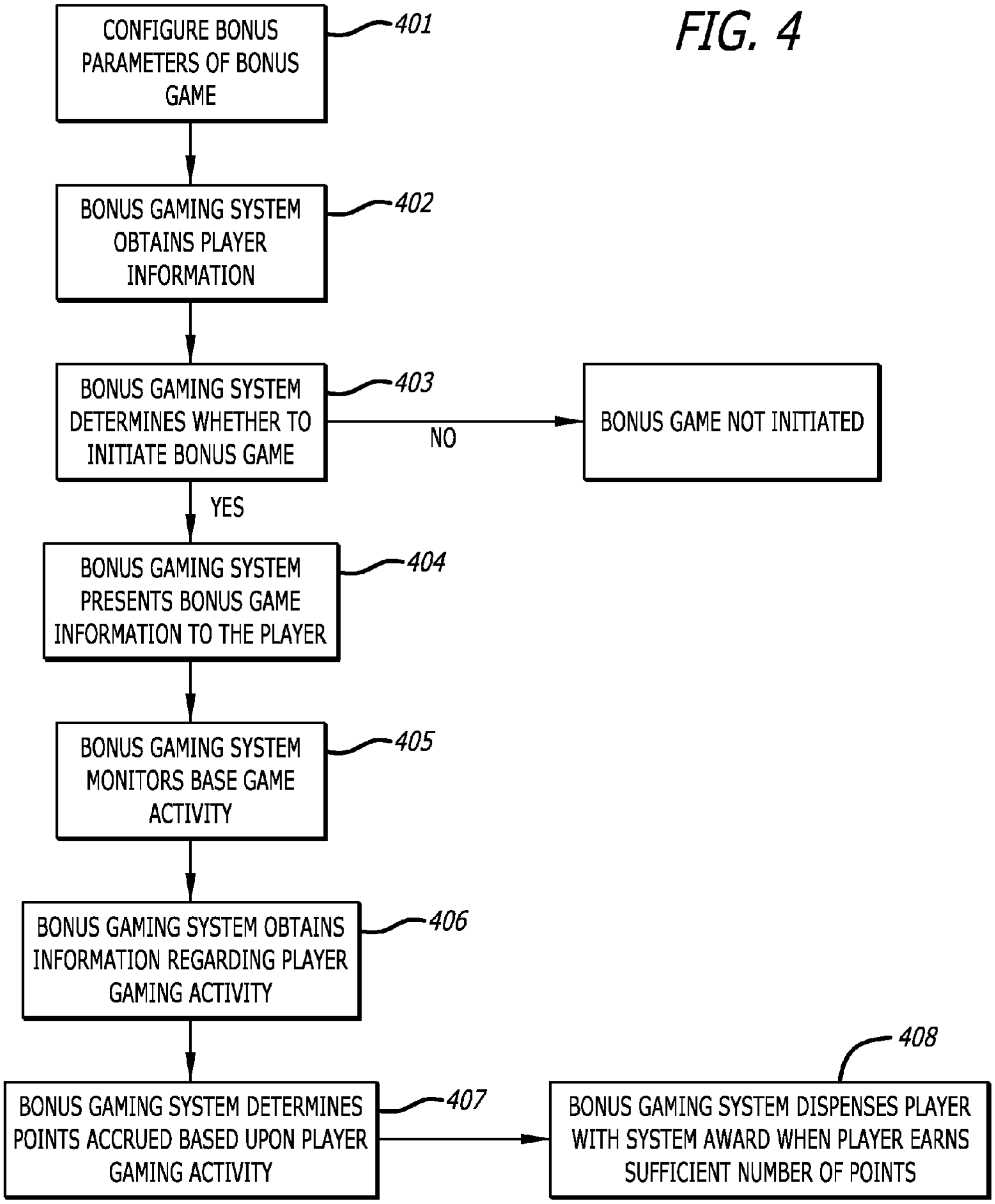
FIG. 4 is a flow diagram of one method of playing a system-level bonus game.

Another aspect of the bonus gaming system 10 relates to various methods of managing a system-level bonus game. Referring now to FIG. 4, the casino operator configures and manages the bonus game at a system level in step 401. Accordingly, the various bonus game parameters for one or more gaming devices may be determined by the casino operator at a remote location. The bonus game parameters include, but are not limited to, the schedule of the bonus game, the number of bonus levels, the number of points per level, participating gaming devices, and player eligibility.

Once the bonus game has been configured, the bonus session may be initiated when the bonus gaming system obtains player information in step 402. According to one method, player information is obtained when the player inserts his/her player card into the card reader 110. Alternatively, the player may input a PIN number or other identification means to initiate the bonus session. In step 403, the bonus gaming system 10 then determines whether the appropriate bonus parameters are satisfied before initiating the bonus session. For example, the system determines whether the player is eligible to participate in the bonus session. If the player meets the requisite requirements, the bonus session is initiated.

Alternatively, when a player inserts his player card into a gaming device 30 that is participating the bonus game, the number bonus levels, points per bonus level, or system awards for each level may be adjusted based upon the player's data. For example, a high roller may be eligible to receive more valuable system awards for fewer points as compared to a regular player.

Once the player data has been received by the gaming system 10, the gaming device 30 presents bonus game information to the player in step 404. In one method, the player is then notified that he is a participant in the bonus session. In another method, the player is notified of the rules and/or instructions regarding the bonus game. In one method, the bonus game information is presented as a multimedia message on the embedded additional user interface 20. The multimedia message may include graphics, animation, video clips, sound, or a combination thereof. Alternatively, a message may be displayed to the player on a two-line digital display (e.g., LED, LCD, VD, or the like). As those skilled in the art will appreciate, other gaming device embodiments may include displays having one or more lines.

In step 405, the system 10 monitors the player's gaming activity during the course of play in the base game. This information regarding the player's activity may be sent by the gaming device to the bonus gaming system 110 in step 406. Alternatively, the bonus gaming system 10 may poll the gaming devices 30 for the player's gaming activity. The player's gaming activity may be information such as, but not limited to, the player's wager per game, number of max bets, number of games played, coin-in (i.e., total amount of money wagered), coin-out, or a combination thereof. Additionally, other information relating to the gaming device 30 may also be sent to the bonus gaming system 10. In step 407, the bonus system 10 determines the number of base 16 and, optionally, bonus points 18 accrued by the player, wherein the accrued points are based upon the player's gaming activity in the base game. In step 408, the bonus system 10 may award the player with a system award when the player achieves prescribed point levels for each bonus level.

The system awards are promotional awards that are purchased with promotional money as opposed to wagered money. The system awards may include, but are not limited to, cash, merchandise, services, or any combination thereof. In one embodiment, the cash award dispensed by the system 10 is a predetermined amount of cash or credit (redeemable for cash). For example, the player may receive a $15 award when reaching the first bonus level, $25 dollars when reaching the second bonus level, and $50 dollars when reaching the third bonus level. In another embodiment, the system award is merchandise such as, but not limited to, a house, car, motorcycle, jewelry, or the like. In another embodiment, the system award may be services such as, but not limited to, vacations, spa packages, free hotel rooms, free meals, and/or free drinks. As those skilled in the art will appreciate, any combination of system awards may be distributed to the player during the course of a bonus game. For example, a free meal may be given away when reaching the first bonus level, a cash prize may be awarded when reaching the second level, and jewelry may be awarded when reaching the third level.

In another method, a multiplier may be triggered during the bonus session. The trigger for the multiplier may be a random event or based upon a predetermined criterion. For example, the multiplier may be triggered when a player has continuously played on the same gaming machine for a particular time duration or has been playing at a particular wagering rate (e.g., number of bets per hour, number of max bets per hour, or dollars per hour). In one method, the multiplier may be capped at particular bonus levels. For example, at bonus level two, the multiplier may be 2×, 3×, or 4× whereas higher multipliers are available at higher bonus levels. When the multiplier has been activated, the points earned may be multiplied by a factor of 2, 3, 4, or any other multiplier factor. Alternatively, the multiplier may be applied to a cash-based system award. That is, the system award may be multiplied by a particular factor.

In one method, when the system 10 determines that a player has achieved a predetermined point level, a signal is immediately transmitted to the gaming device 30, notifying the player(s) of a system award. For example, a multimedia message may be presented on the embedded additional user interface 20 notifying the player that they had been rewarded with a particular system award as a result of achieving a particular bonus level. In another embodiment, the player is notified that they have won a system award when the player removes his player tracking card from the gaming device 30. Optionally, the gaming device 30 may have lights, sounds or other means of notifying a player that they have won a system award. In another embodiment, the gaming device 30 has a graphical display that notifies a player that they have won a system award. In still another method, a casino representative goes to the winning machine and personally notifies the player that they have won a system award. As those skilled in the art will appreciate, one or more of the above-mentioned embodiments may be combined together to notify a player that they have won a system award.

In one method, once a player has won a system award, the award is downloaded to the player's account for redemption. The player can then redeem the cash prize on the gaming device 30 by taking a positive action such as, but not limited to, depressing a button or requesting that the award be downloaded to the gaming machine. In another method, the gaming device 30 prints out a voucher that is redeemable for the award. In yet another method, a player supplies biometric data such as, but not limited to, a fingerprint or signature to redeem the prize at the gaming device 30. Alternatively, the player inputs a PIN number in order to redeem the prize. As those skilled in the art will appreciate, it is contemplated that the gaming device 30 may have any means for verifying the identity of a player that is known or developed in the art.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. In a bonus gaming system including one or more gaming devices interconnected via a network, each gaming device comprising a gaming processor, a player tracking system in communication with the gaming devices, and a bonus gaming system in communication with the gaming devices and comprising a processing and control system and a desktop computer, the bonus gaming system monitoring and controlling bonus sessions presented on the gaming devices, a method of managing a system level bonus game comprising:

configuring by the desktop computer, at the system level various parameters of the bonus game including a plurality of bonus levels represented by a number of points earned during the course of play of a base game, wherein earning points in the bonus game is based upon the player's time of play;

initiating by the processing and control system a bonus session when the bonus gaming system obtains player information from the player tracking system;

monitoring by the gaming processor gaming activity during the course of play of a base game, wherein monitored gaming activity represents the player's time of play;

providing information from the gaming processor to the processing and control system regarding player time of play to the bonus gaming system;

determining by the processing and control system a number of base points accrued by a player based upon player time of play in a base game;

determining by the processing and control system a number of bonus points accrued by a player based upon player time of play in a base game and the current bonus level of the bonus game; and awarding by the gaming processor a player a system award when the player achieves prescribed base and bonus point levels for each bonus level.

2. The method of claim 1 wherein determining by the processing and control system a number of bonus points accrued by a player based on player gaming activity in a base game comprises the processing and control system multiplying the number of base points accrued by a player based upon player gaming activity in a base game by a multiplier related to the current bonus level of the bonus game.

3. The method of claim 1 further comprising the processing and control system determining if appropriate bonus parameters are satisfied before initiating a bonus session.

4. The method of claim 1 wherein the various bonus game parameters for the one or more gaming devices is determined by a casino operator at the desktop computer at a remote location.

5. The method of claim 4 wherein the bonus game parameters determined at the desktop computer include at least one of: a schedule of a bonus game, a number of bonus levels, a number of points per bonus level, participating game devices, and player eligibility.

6. The method of claim 1 wherein player information is obtained from the gaming processor when a player inserts a player card into a card reader on a gaming device.

7. The method of claim 1 wherein player information is obtained from the gaming processor when a player inputs a PIN number or other identification means.

8. The method of claim 1 wherein, when player information is obtained from the gaming processor, various game parameters are adjusted by the gaming processor based upon player information.

9. The method of claim 1 further comprising presenting bonus game information to the a player by the gaming processor.

10. The method of claim 9 wherein a player is notified of bonus game information by the gaming processor, being at least one of: being a participant in a bonus session, the rules and/or instructions regarding the bonus game.

11. The method of claim 9 wherein the bonus game information is presented by the gaming processor as a multimedia message on an embedded additional user interface on the gaming device and includes at least one of: graphics, animation, video clips, and sound.

12. The method of claim 9 wherein the bonus game information is presented by the gaming processor on a two line digital display.

13. The method of claim 1 wherein player information regarding player activity is sent to the processing and control system in the bonus gaming system from the gaming processor in the gaming devices.

14. The method of claim 1 wherein the processing and control system in the bonus gaming system polls the gaming processor in the gaming devices for player information regarding player activity.

15. The method of claim 1 wherein the player information regarding player activity comprises one or more of: player wager per game, number of maximum bets, number of games played, total amount of money wagered, total amount of money paid.

16. The method of claim 1 wherein the longer the player plays the base game, the more base points the player earns for the bonus game.

17. The method of claim 1 wherein the bonus game is configured to have one point correspond to a particular game play duration for the base game.

18. The method of claim 1 wherein the bonus game is configured so that five minutes of playing the base game corresponds to one bonus point.

* * * * *